United States Patent [19]

Cocozzella

[11] 3,879,564

[45] Apr. 22, 1975

[54] METHOD OF MAKING A FROZEN PIZZA SHELL AND PIZZA

[76] Inventor: Antonio Cocozzella, 13419 Sherwood Forest Dr., Silver Spring, Md. 20904

[22] Filed: June 27, 1973

[21] Appl. No.: 374,092

[52] U.S. Cl. ............... 426/283; 426/94; 426/95; 426/305; 426/343; 426/138
[51] Int. Cl. ............................................. A23l 1/10
[58] Field of Search ............ 426/18, 19, 27, 94, 95, 426/100, 152, 283, 345, 391, 496, 89

[56] References Cited
UNITED STATES PATENTS

| | | |
|---|---|---|
| 2,549,595 | 4/1951 | Gregor.................................. 426/19 |
| 2,668,117 | 2/1954 | Bucci.................................... 426/19 |
| 2,774,316 | 12/1956 | Daino ................................. 426/391 |
| 3,161,523 | 12/1964 | Ort........................................ 426/19 |
| 3,347,181 | 10/1967 | Pizzo............................... 426/344 X |
| 3,615,678 | 10/1971 | Tangel .............................. 426/94 X |
| 3,777,039 | 12/1973 | Van Patten............................. 426/62 |

*Primary Examiner*—Raymond N. Jones
*Attorney, Agent, or Firm*—Edwin E. Greigg

[57] ABSTRACT

A frozen pizza shell can be made from a quantity of dough by first forming the dough into a pizza shell, allowing the dough to rise in a controlled environment, baking the pizza shell so as to form an outer crust portion on the shell which encases a substantially raw core portion thereof, and thereafter freezing the pizza shell.

4 Claims, 2 Drawing Figures

METHOD OF MAKING A FROZEN PIZZA SHELL AND PIZZA

BACKGROUND OF THE INVENTION

1. Field of the Invention

The present invention relates to the making of a frozen food product and to the product itself. More particularly, the present invention relates to the method of making a frozen pizza shell, a frozen pizza and the pizza shell itself.

2. Description of the Prior Art

Over the years the tomato pie, or as it is more commonly known, the pizza pie or simply pizza, has become a truly national food. The popularity of the pizza today has so accelerated that it probably enjoys a pre-eminence equal to that of the hot dog or to that of popcorn. In keeping with the ever increasing demand for pizza, the food industry has converted what was traditionally a food requiring many hours of preparation into a fast food product. This has resulted in placing a variety of pizza products on the market, each of which, although for the most part a frozen food, invariably claims to provide an authentic pizza which is the equivalent of any pizza made-to-order, that is to say, a pizza which is made from freshly made dough.

It has long been appreciated by those individuals skilled in the culinary art of pizza making, that of all the ingredients which combine to make a pizza, the dough is by far the most important. Ideally the dough should retain a structure and texture as closely characteristic to freshly baked dough as possible, even though the pizza is purchased in a frozen state. In this way the consumer is assured of purchasing a product which closely matches a made-to-order pizza.

None of the attempts in this area of which I am aware can actually claim to have succeeded in their efforts in this regard. Consider, for example, U.S. Pat. Nos. 2,668,117; 3,347,181; 3,615,678 and 3,667,963, which disclose various methods of making a pizza. None of these, however, will yield a pizza which satisfactorily compares to a made-to-order pizza.

It would, therefore, be desirable to have available a method which when practiced will yield a pizza which compares satisfactorily to a made-to-order pizza.

OBJECTS AND SUMMARY OF THE INVENTION

It is, therefore, an object of the present invention to provide a method of making a frozen food product, such as a pizza, which favorably compares to a made-to-order pizza.

It is a related object of the present invention to provide a method of making a frozen food product, such as a pizza shell, which can be used, for example, in making a pizza which favorably compares to a made-to-order pizza.

It is another related object of the present invention to provide a pizza shell made by the previously noted method.

These and other objects are accomplished according to the present invention by providing a quantity of dough, at least sufficient to make an average size pizza, and proceeding as follows:

a. forming the dough into a pizza shell;
b. causing the dough forming the pizza shell to rise in a controlled environment;
c. baking the pizza shell so as to form an outer crust portion on the shell which encases a substantially raw core portion thereof; and
d. freezing the pizza shell.

DESCRIPTION OF THE PREFERRED EMBODIMENTS

The present invention is unique in that it is practically indistinguishable from a pizza which is made-to-order, even though it has been purchased as a frozen food product. The reason for this is probably due most significantly to the fact that the dough forming the pizza shell is frozen after the dough is permitted to rise and to the fact that a substantial portion of the dough is retained in a raw state.

Figure 1:
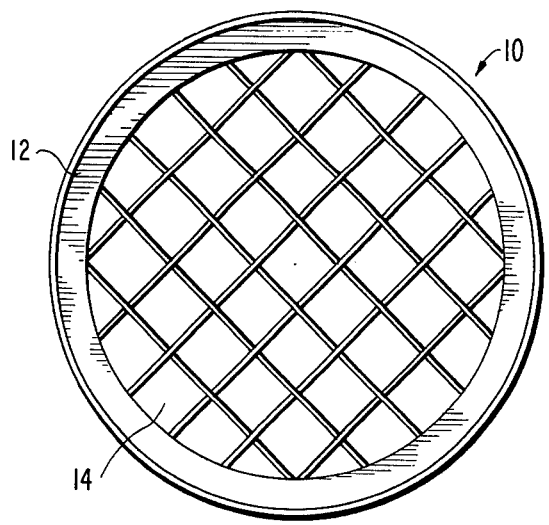
FIG. 1 is a plan view of a grid-type baking pan used in the present invention.

The dough is made in a usual manner known to almost any housewife. For example, I prefer to make a batch of dough using 50 lbs. of flour, 2 to 3 gallons of water, 7 to 8 oz. of salt, 10 oz. of yeast, and, if desired, 4 oz. of sugar. These ingredients are then kneaded to form the working dough. It should be understood, that any size batch of dough can be used to successfully practice the invention. After the dough is sufficiently kneaded it is permitted to rise a first time for approximately 45 minutes in a controlled environment having a temperature of approximately 80° and a humidity of approximately 85 %. The environment could be the room where the dough is kneaded or it could be a proofing chamber to which the dough is conveyed on, for example, a conveyor system. Preferably, the dough is covered with, for example, a plastic substance which substantially prevents contact of the dough with the environmental air thereby ensuring that the dough does not become excessively flaky. After the dough has risen a first time, it is divided into approximately 12 oz. portions. The divided portions are then placed in a tray and caused to rise a second time for approximately 45 minutes in a similar controlled environment. Once again the individual portions are preferably covered. The individual portions are thereafter formed into individual pizza shells. This is preferably done by passing the portions through a stretching machine which is known in the art. The individual pizza shells are then placed on a baking screen or a grid-type baking pan (FIG. 1) immediately after having been formed into a shell, that is, before the dough forming the pizza shell begins to rise a third time. Once the shell is placed on the screen it is no longer manually handled. The grid-type baking pan includes an outer solid rim portion 12 and a grid-type center 14. The pizza shells then have a tomato sauce layer placed on their upper surfaces. They are then caused to rise a third time for approximately 15 minutes in a similar controlled environment. After rising a third time the pizza shells are placed with their grid-type baking pans in an oven at a temperature of approximately 300° and allowed to bake for approximately 2 to 3 minutes.

Figure 2:
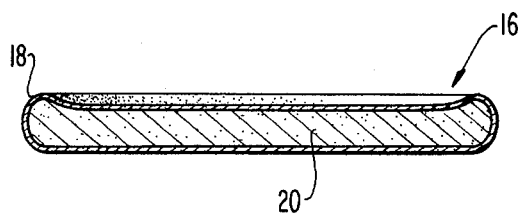
FIG. 2 is a cross sectional view through a pizza shell made according to the present invention illustrating the outer crust portion and the raw core portion.

The pizza shell 16 shown in FIG. 2 is the result of the method so far described. The shell 16 is formed with an outer crust portion 18 which encases a substantially raw core portion 20. The crust 18 is very thin and serves basically to provide the shell 16 with a structural surface for supporting the desired topping to be subsequently applied without causing the shell to collapse. In this way the raised center core 20 is retained.

The crust 18 is substantially continuous even on the bottom surface of the shell due to the grid-type structure 14, which is structurally sufficient to support the pizza while exposing a maximum surface of the pizza shell 16.

Finally any desired pizza topping is placed on the upper surface of the shell 16 and it is thereafter frozen and packaged for consumer use.

Although I have described a method for making a plurality of pizzas simultaneously, it should be understood that a single pizza could be made if desired. A sufficient proportionality of ingredients would be combined to form the dough which in turn could be directly formed into a pizza shell and placed on a grid-type baking pan. Then a tomato sauce is spread on the top surface of the pizza shell and thereafter is caused to rise for approximately 45 minutes in a controlled environment similar to that described above. It is then baked in a similar manner to form the outer crust and raw core. The pizza shell thus made can then be topped and frozen.

An alternative method would be to first allow the dough for making the single pizza to rise for approximately 45 minutes in a similar controlled environment and thereafter to form the dough into a pizza shell and proceed as indicated immediately above.

Each of these variations results in a pizza which unlike the present state of the art, most nearly approaches a made-to-order pizza.

It is also to be understood that the particular shape of the pizza is immaterial to the present invention.

That which is claimed is:

1. A method of making frozen pizza shells from a batch of dough, comprising:
   a. covering the dough to substantially prevent contact with the environmental air and causing the dough to rise a first time in a controlled environment having a temperature of approximately 80°F and a humidity of approximately 85% for approximately 45 minutes;
   b. dividing the dough into a plurality of portions of approximately equal weight;
   c. covering the plurality of portions to substantially prevent contact with the environmental air and causing the dough forming the plurality of portions to rise a second time in said controlled environment for approximately 45 minutes;
   d. forming a plurality of pizza shells from the plurality of portions;
   e. causing the dough in the form of the pizza shells to rise a third time in said controlled environment for approximately 15 minutes;
   f. baking the pizza shells at a temperature of approximately 300°F for approximately 3 minutes to form thereby an outer crust portion on each shell which encases a substantially raw core portion thereof; and
   g. freezing the pizza shells.

2. The method as defined in claim 1, further comprising the step of placing the pizza shells in a grid-type baking pans, and thereafter proceeding according to steps (e)–(g).

3. A method of making frozen pizzas from a batch of dough, comprising:
   a. covering the dough to substantially prevent contact with the environmental air and causing the dough to rise a first time in a controlled environment having a temperature of approximately 80°F and a humidity of approximately 85% for approximately 45 minutes;
   b. dividing the dough into a plurality of portions of approximately equal weight;
   c. covering the plurality of portions to substantially prevent contact with the environmental air and causing the dough forming the plurality of portions to rise a second time in said controlled environment for approximately 45 minutes;
   d. forming a plurality of pizza shells from the plurality of portions;
   e. causing the dough in the form of the pizza shells to rise a third time in said controlled environment for approximately 45 minutes;
   f. applying a tomato sauce to the top surface of each pizza shell;
   g. baking the pizza shells at a temperature of approximately 300°F for approximately 3 minutes to form thereby an outer crust portion on each shell which encases a substantially raw core portion thereof; and
   h. applying a topping to the top surface of each pizza shell; and
   i. freezing the pizza shells.

4. The method as defined in claim 3, further comprising the step of placing the pizza shells in grid-type baking pans, and thereafter proceeding according to steps (e) – (i).

* * * * *